May 22, 1945.    G. W. BUTROVICH ET AL    2,376,320
HYDRAULIC SYNCHRONIZER
Filed May 11, 1942    2 Sheets-Sheet 1

GEORGE W. BUTROVICH, and
CLINTON E. DEARDORFF
Inventors;

By
Attorney

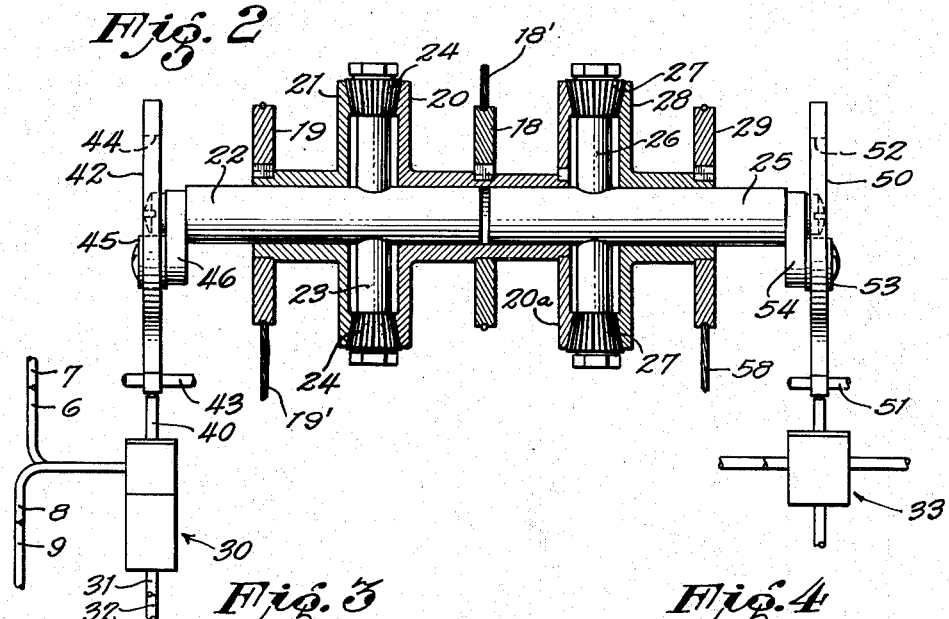
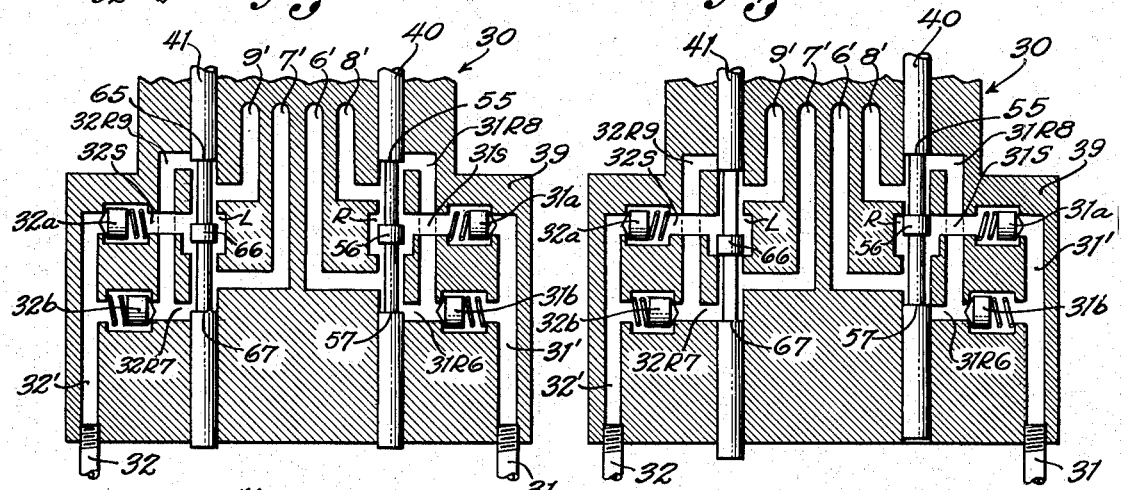
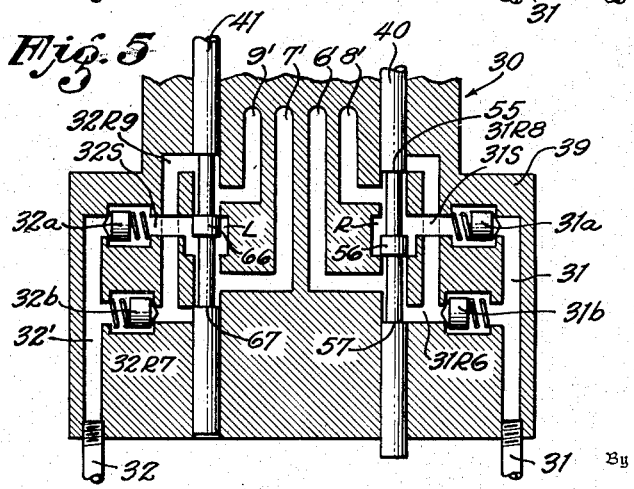

Patented May 22, 1945

2,376,320

UNITED STATES PATENT OFFICE 2,376,320

HYDRAULIC SYNCHRONIZER

George W. Butrovich, Tulsa, Okla., and Clinton E. Deardorff, Santa Monica, Calif., assignors to Douglas Aircraft Company, Inc., Santa Monica, Calif., a corporation of Delaware Application May 11, 1942, Serial No. 442,524

9 Claims. (Cl. 60—97)

The present invention relates to means for obtaining synchronization of separately operated airplane parts, such, for example, as control surfaces to assure that they will have like movement. More particularly the invention relates to such means capable of controlling both the supply and return conduits of reversible hydraulic units, whatever the direction of load.

The invention specifically relates to a simplified means of comparatively light weight for synchronizing movement of a plurality of members which must move together but are actuated by separate hydraulically operated power units, for example, airplane wing flaps, landing gear, doors, etc.

As an example of the utility of the invention, reference may be made to control flaps which in large aircraft are operated by double acting hydraulic cylinders fed with pressure fluid from a single source. Differences in frictional loads and other loads will often cause one of the flaps to travel at a rate different from the rate of movement of the other, producing a dangerous condition which can be avoided only by synchronizing the movement of the control flaps. It is therefore an object of the invention to provide a mechanism to obtain synchronism of movement of a plurality of elements contributing to the maneuverability of airplanes or other vehicles, such elements being driven in one direction or the reverse by separate motors automatically controlled by movement of parts which they drive.

Another object of the invention is to provide a hydraulic synchronizing valve mechanism of the kind described of relatively light and simple construction.

A further object of the invention is to provide a hydraulic synchronizing valve mechanism combined with a manually operated control valve, the construction being such that the operating valve is set to cause raising or lowering of a plurality of loads and is automatically closed under control of differential mechanism which insures that the loads are raised or lowered in synchronism.

A further object of the invention is to provide hydraulic synchronization mechanism comprising two differential units, one of said units operating to effect movements of a valve controlling flow of hydraulic fluid to two hydraulic units, while the other differential controls the operation of said units to act in unison, corresponding bevel gears of said differentials being connected together for unitary movement.

A further object of the invention is to provide a hydraulic synchronization mechanism controlling the working of a plurality of hydraulic units and acting to reduce the flow through both supply and return conduits of a hydraulic unit which is moving ahead of another unit.

A further object of the invention is to provide a hydraulic synchronization mechanism controlling the working of a plurality of hydraulic units acting simultaneously to raise or lower a load by acting to interrupt the supply and return conduits of a unit which has moved a predetermined distance in advance of its position corresponding to the position of another unit, whether said load is being raised or lowered.

Further objects and features of the invention will be brought out in the following part of the specification and/or drawings. The form of the invention shown in the drawings is given by way of illustrative embodiment only and the scope of the invention is not in any way limited thereby, but only as defined by the appended claims.

In the accompanying drawings,

Fig. 2 is a view in cross section of the differential unit incorporated in our invention, together with associated cams, cables, and valves.

Fig. 3 is a sectional view through the synchronizing valve, showing the valve stems in centralized or intermediate positions, in which they are held when the wing flaps are in synchronized relation.

Fig. 4 is a schematic view similar to Fig. 3 showing the positions of the valve stems when the right hand flap 1 is lower than the left hand flap 2.

Fig. 5 is a schematic view similar to Fig. 3 showing the positions of the valve stems when the left hand flap is lower than the right hand flap.

Figures 1, 6:
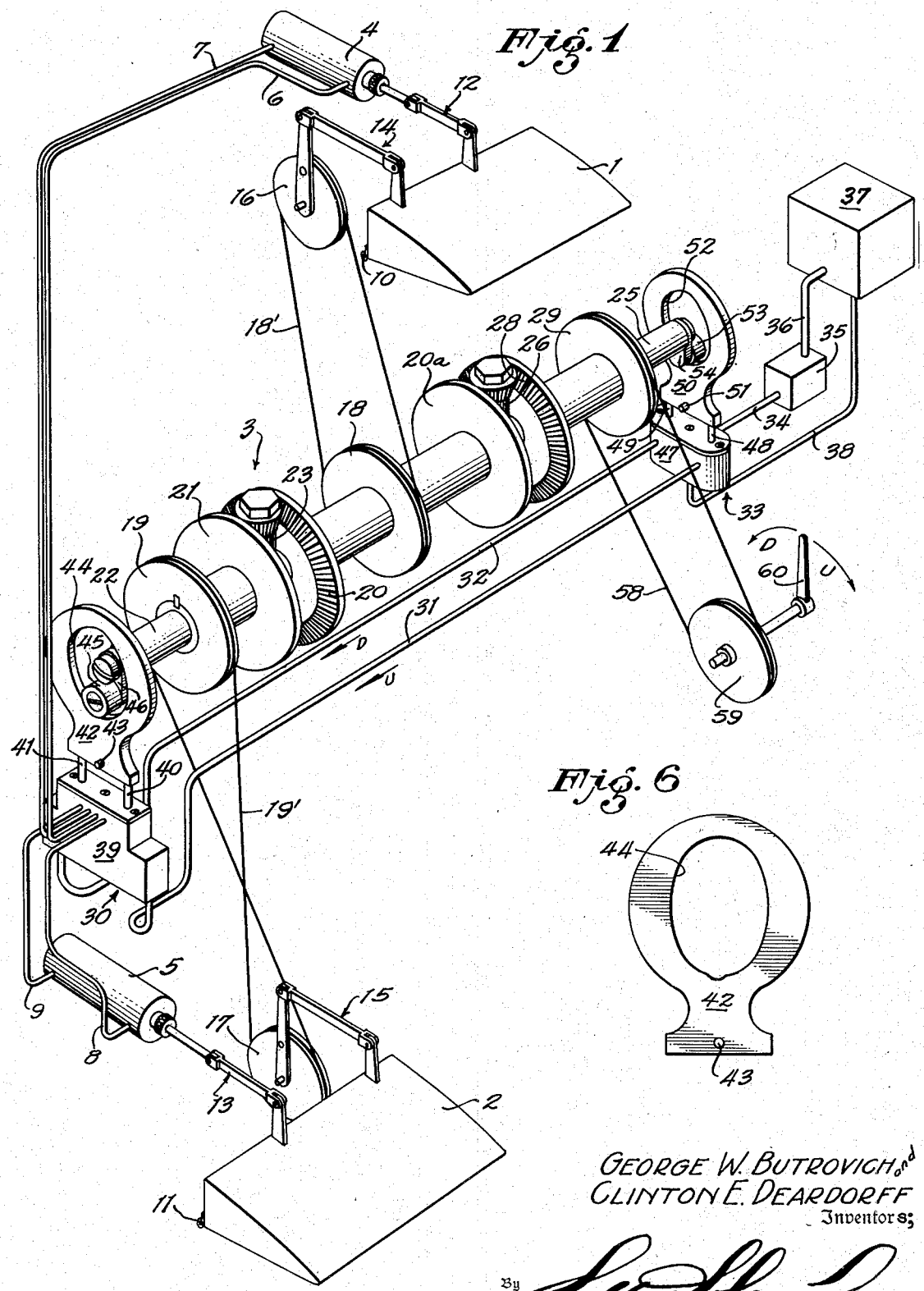
Fig. 1 is a diagrammatic view of the general arrangement of the synchronizing means of our invention as applied to the control of the landing flaps of a large monoplane.
Fig. 6 is a face view of one of the valve operating cams.

The invention will be described by way of example as applied to the synchronization of a pair of right and left wing flaps 1 and 2, shown in Fig. 1, which is purely schematic and does not show the flaps in the positions which they occupy in an aircraft, but in simple manner show the flaps in operative relation to a control device 3.

The flaps 1 and 2 are operated by fluid motors shown as double acting cylinders 4 and 5. Ducts 6 and 7 are connected to the rear and front ends of cylinder 4 and ducts 8 and 9 are similarly connected to the cylinder 5.

Flaps 1 and 2 are provided with pivots 10 and 11 respectively, and are connected by links 12 and 13 respectively to the pistons of the cylinders 4 and 5 by which the flaps are swung so as to raise and lower the outer edge portions thereof for plane control purposes, as should be obvious. Flaps 1 and 2 are further provided with lever and link mechanisms 14 and 15 connected to pulleys 16 and 17 respectively, which pulleys rotate in one direction or the other, as the flaps are pivoted.

The control and synchronizing mechanism, as shown in Fig. 2, comprises a synchronizing pulley 18 connected by a suitable cable 18' to the pulley 16 for the right hand flap 1, and a similar synchronizing pulley 19 connected by a cable 19' to the pulley 17. The hub portion of the pulley 18 is provided with a bevel gear 20 at one end and a bevel gear 20a at the other end. The hub of the pulley 19 is similarly secured to a bevel gear 21. A shaft 22, suitably mounted for rotation, rotatably supports the pulley 19 and the gear 21. The shaft 22 projects into one end of the hub of the pulley 18 and further serves to provide a partial bearing support for the pulley 18 and the bevel gears 20 and 20a. A spider 23 is secured to or formed integral with the shaft 22 and carries thereon a plurality of bevel pinion gears 24, which mesh with the bevel gears 20 and 21. A shaft section 25 coaxial with the shaft 22 is suitably mounted for rotation and provides partial bearing support for the hub of the pulley 18 and the bevel gears 20 and 20a and is provided with a spider 26 having a plurality of bevel pinion gears 27 which mesh with the bevel gear 20a and a bevel gear 28, the hub portion of which carries an actuating pulley 29.

A synchronizing valve structure 30 is provided with ducts 31 and 32 which connect with an actuating valve structure 33 which is supplied with a fluid under pressure through a duct 34 connected to a pump 35 having a duct 36 connected thereto from a fluid reservoir 37, a duct 38 being provided for the return of fluid from the valve structure 33 to the reservoir 37.

The synchronizing valve 30 has a valve body 39 in which are reciprocably mounted a pair of pistons or valve stems 40 and 41, the end portions of which extend through the valve body so as to be actuated in opposite directions by a valve lever 42 having a suitable pivot bearing 43. The valve lever 42 has a cam portion 44 adapted for engagement with a roller 45 carried by a crank arm 46 suitably secured on the shaft 22.

The valve 33 has a valve body 47 provided with valve pistons or stems 48 and 49 suitably secured to an actuating lever 50 having a pivot mounting 51 such that the rocking of the lever 50 causes the pistons 48 and 49 to move in opposite directions so as to connect the fluid pressure from the duct 34 to the ducts 31 or 32 and to connect whichever of the ducts 31 or 32 is carrying the return fluid to the return duct 38. The valve lever 50 is provided with a cam portion 52 for engagement with a roller 53 mounted on a crank arm 54 secured to the shaft 25. The cams 44 and 52 are formed as shown in Fig. 6 so that the first portion of the movement of the rollers 45 and 53 from intermediate or neutral position will actuate the valve levers 42 and 50. Accordingly, small initial rotation of the shafts 22 and 25 will actuate the valves and thereafter further rotation of the shafts 22 and 25 may occur without further movement of the levers 42 and 50.

The ducts 6, 7, 8, and 9 are connected to passages 6', 7', 8', and 9' in the interior of the valve structure 30 as shown in Figs. 3, 4, and 5. The valve stem 40 is formed so as to provide spaced valve closures 55, 56, and 57 in a valve chamber R having cylindrical seats between the ends of passages 6' and 8', and passages 31S, 31R6 and 31R8, which connect with a passage 31' which connects to the duct 31, as shown in Figs. 3 to 5. The passage 31S connects with the duct 31 and has a spring seated check valve 31a which opens inwardly to the duct 31S to permit a flow of fluid under pressure from the duct 31 into the passage 31S to the central portion of the valve chamber. The passages or ports 31R6 and 31R8 are connected together and are connected to the duct 31 through a spring seated check valve 31b which opens to permit a return of fluid from the passage 31R6 or 31R8 to the duct 31 when the latter is operating as a return duct.

The valve stem 41 is similarly formed so as to provide valve closures 65, 66, and 67 adapted to engage cylindrical valve seats in a valve chamber L which interconnect ducts 7' and 9' with valve passages 32S, 32R7, and 32R9 which connect with a passage 32' having connection with the duct 32 through check valves 32a and 32b, similarly to valves 31a and 31b.

A cable 58 is operably connected to a pulley 29 and to a quadrant 59 which is suitably pivot mounted to be actuated by a control lever 60 preferably situated in the pilot's cabin of the aircraft.

In the operation of the invention, the control lever 60 is rocked, as indicated by arrows U and D, in one direction to cause the actuation of flaps 1 and 2 to be raised and in the opposite direction to cause the flaps to be lowered. Assuming that it is desired to lower the flaps, the lever 60 is rotated towards D which causes the quadrant 59 to rotate, and through the cable 58 the pulley 29 is rotated in counterclockwise direction as seen in Fig. 1. This causes the gear 28 to turn the spider 26 in the counterclockwise direction, causing the shaft 25 to rotate the crank arm 54, the roller 53 thereof then rocking the lever 50 on the pivot 51 in clockwise direction so as to move the pistons 48 and 49 in such manner that the fluid pressure from the duct 34 is transmitted through the duct 32 to the valve structure 30. Assuming that the flaps 1 and 2 were previously in a synchronized position, the position of the synchronizing mechanism will be substantially that indicated in Fig. 1, and the valve actuating lever 42 will be in midposition and pistons 40 and 41 will assume the position shown in Fig. 3. The fluid under pressure from the passage 32' will open the check valve 32a and pass into the valve chamber L and around the valve closure 66 to the passages 7' and 9' and thence through the ducts 7 and 9 into cylinders 4 and 5 so as to actuate the pistons therein, which are connected to the links 12 and 13, thus causing downward movement of the flaps. The movement of the pistons in the cylinders 4 and 5 will cause a return flow of fluid in the ducts 6 and 8 through the passages 6' and 8' to the chamber R, then around the valve closure 55 and through the passages 31R6 and 31R8, unseating the check valve 31b, and thence into and through the duct 31, through the valve structure 33 and the return duct 38 to the reservoir 37. The movement of the flaps 1 and 2 as indicated will be transmitted by the drums 16 and 17 and the cables thereon to the pulleys 18 and 19 which, being rotated in opposite directions, will result in no movement of the spider 23 and therefore no change in the position of the valve lever 42 as long as the movement of the flaps is the same, or in other words, synchronized. The downward movement of the flaps will cause rotation in clockwise direction of the pulleys 16 and 18 and the gear 20a, which turns with the pulley 18, will rotate in clockwise direction and rotate the spider 26, returning it to its normal position, which will rock the lever 50 back to its normal or midway position, such that there will be no flow of fluid in either duct 31 or 32. Thus the angular movement of the flaps is proportional to the angular movement of the control lever 60.

By similar movement of the actuating lever 60 in the opposite direction toward U, the pulley 29 will be rotated in clockwise direction, and the spider 26, the shaft 25, and the lever 50 will be given opposite movement, so as to provide flow of fluid under pressure in the duct 31 and a return of fluid in the duct 32 through the valve structure 30, unseating the valve 31a, and through the passage 31S into the ducts 6 and 8, so as to move the pistons in the cylinders 4 and 5 forwardly to raise the flaps, upon which movement the rotation of the pulley 18 and the gear 20a will restore the spider 26, the shaft 25, and the lever 50 to normal position.

Upon the occurrence of one of the flaps moving at a rate different from the other so as to cause an unbalanced condition, the differential mechanism becomes operative to arrest the movement of the faster moving flap until the two flaps are in synchronism as follows. Assuming the flaps to be moving downwardly, as first explained hereinabove, and assuming also that the right hand flap 1 for any reason moves faster than the left hand flap 2, the rotation of the pulley 18 and the gear 20 will be faster than the rotation of the pulley 19 and the gear 21, with the result that the spider 23 will be rotated clockwise, causing the shaft 22 and the crank arm 46 to rock the lever 42 anticlockwise so as to depress the piston 41 and raise the piston 40 to the positions shown in Fig. 4. With the pistons in the positions shown, valve closure 66 will close off the passage 7' from the passage 32S, and the valve closure 57 will close off the passage 6' from the passage 31R6, thus preventing fluid flow either into or out of the cylinder 4 which will stop the movement of the flap 1 until the spider 23 has been turned by the gear 21 and the crank arm 46 to the mid-position whereupon the valve lever 42 and the pistons 40 and 41 will be returned to the mid-position shown in Fig. 3 and fluid pressure will be supplied to both cylinders 4 and 5 until the end of the desired movement as determined by the position of the levers 60 or until another unbalanced condition develops.

In the foregoing, we have described the valve action which occurs whenever the right hand flap 1 is below the left hand flap 2. In Fig. 5 we show the synchronizing valve positions occurring when the left hand flap 2 is below the right hand flap 1, as, for example, when the right hand flap 1 moves slower than the left hand flap 2. During this condition, the valve closure 66 closes off the passage 9' from the fluid supply from the passage 32S, and the closure 55 closes off the passage 8' from the passage 31R8, which thus immobilizes the piston in the cylinder 5 and the movement of the flap 2 is arrested until the flap 1 has been brought up to synchronizing position therewith.

In the examples just described, the check valves 31A and 32B have remained in closed position, the fluid having been past check valves 32A and 31B with the fluid pressure being supplied through the duct 32 and returned through the duct 31.

Fig. 4 shows the positions of the valve pistons 40 and 41 whenever the flap 1 is below the flap 2, and Fig. 5 shows the positions of these valve pistons whenever the flap 1 is above the flap 2, regardless of the direction in which the fluid is applied to the cylinders 4 and 5. For example, to raise the flaps 1 and 2 fluid will pass under pressure through the duct 31 and out through the passages 6' and 8' to the ducts 6 and 8 respectively. Should flap 1 lag in its upward movement so as to occupy a position below the position of flap 2, the valve pistons 40 and 41 of Fig. 4 will be moved into the positions thereof shown in Fig. 4. Then, the flow of pressure fluid from the passage 31' past the check valve 31a will be conducted only to the passage 6' due to the fact that this passage 6' is the only one at this time communicating with the chamber R which receives the pressure fluid from the passage 31'. Also, the return valve 32b will be connected only with the passage 7', and the passage 9' will be cut off from communication with the return valve by the valve closure 65 in lowered position. The pressure fluid will now be fed only through the duct 8 to the rightward end of the cylinder 4 to produce upward movement of the flap 1, flap 2 remaining stationary until the flap 1 has moved into synchronized relation thereto, whereupon the valve pistons 40 and 41 will be returned to their neutral positions shown in Fig. 3 and pressure fluid will be then fed through the passages 6' and 8' to both of the cylinders 4 and 5.

If during upward movement of the flaps, the flap 1 should travel ahead of the flap 2, or the flap 2 should lag behind the flap 1, the valve pistons 40 and 41 will be brought into the positions thereof shown in Fig. 5, cutting off passages 6' and 7' respectively from communication with the pressure fluid passage 31' and the return valve 32b, but maintaining communication of passages 8' and 9 respectively with the pressure fluid passage 31' and the return valve 32b, until the flap 2 has been moved up to a position of synchronization with relation to the flap 1.

In the description of the valve operation given above, it was assumed that pistons 40 and 41 were moved to their extreme positions in each case. However, it is obvious that the corrective effect commences as soon as the pistons and valves begin to move, and therefore synchronism will be restored in many instances without extreme movements of the pistons and consequent complete stoppage of the faster moving flap. In practice, the operation is gradual even though one flap may be operating continuously against a higher resistance than the other.

We claim as our invention:

1. In control apparatus for use on aircraft, the combination of: a pair of movable elements; hydraulic means associated with each element for effecting adjusting movements of the same; mechanism connected with said elements for dual control thereof, including means for arresting the actuating movement of either of said hydraulic means when the same has moved its controlled element farther than the other of said elements, and including means for continuing the actuation of the hydraulic means of the other of said elements until its degree of advance equals that of the arrested element, a valve for controlling the flow of fluid simultaneously to both of said hydraulic means for effecting simultaneously the adjustment of said movable elements; a valve operator adapted to assume a plurality of positions, each determining a different degree of adjustment of said movable elements; a manual control device; follow-up means operated by movement of said movable elements; and means differentially connecting said manual control device and said follow-up means to said valve operator in such a manner that movement of said manual control device to a selected position will produce movement of said valve operator to a corresponding position from which it will be returned to a neutral position by said follow-up means when said movable elements have completed the degree of adjustment predetermined by the selected position of said control device.

2. In a synchronizing control apparatus for use on aircraft, the combination of: two movable elements to be controlled; a power operated device corresponding to each of said movable elements for actuating the same; a first valve means for controlling flow of the operating fluid for said power operated devices; a differential unit including a first gear wheel and a second gear wheel with a pinioned spider therebetween and jointly controlled thereby; a hand actuated control member connected to the first named gear wheel; means actuated by said spider for actuating the said valve means; a second differential unit including a first gear wheel and a second gear wheel with a pinioned spider between the same, and jointly controlled thereby; a second valve means receiving operating fluid from the first named valve means; means for controlling said second valve means from said second named spider; means for connecting both of said second gears to one of said movable elements; and means for connecting the first gear of the second differential to the other of said movable elements; all of said parts cooperating to cause the second valve means to arrest the movement of either of said elements if the same becomes more advanced than the other element, and operating thereafter to advance the other element to synchronize it to the arrested element.

3. Synchronizing control apparatus according to claim 2, in which the said first gear of the first differential unit is provided with a pulley and the hand actuated controlled member is provided with a pulley, with a cable connecting said pulleys; and said second gear wheels having a pulley connected therewith; a corresponding pulley therefor actuated by one of said movable elements, with a cable connecting the same; said first gear wheel of the second unit having a pulley rigid therewith; and a pulley actuated by the other of said movable elements with a cable connecting the same with said last named pulley.

4. In control and synchronizing means for a pair of elements normally movable in synchronism in either of two directions, each of said elements having a fluid driven power device for driving the same in each of said directions, the combination of: manually actuated control means for the drive fluid to move said elements in either of said directions; and differentially actuated control means for the drive fluid having slide valves adapted upon unsynchronized movement of said elements to selectively lock the power device of one of said elements against movement in either direction, said differentially actuated control means including a valve structure, a pair of fluid ducts for each of said power devices; two slide valves each controlling one of each of said pairs of fluid ducts, and means for simultaneously actuating both slide valves to close the ducts for the power device associated with the elements that have been moved into an advanced position relative to the other of said elements.

5. In control apparatus for use on aircraft, the combination of: a pair of elements normally movable in synchronism; a fluid actuated motor corresponding to each of said elements for moving the same; manually actuated control means; a valve device; differential means including a first gear wheel and a second gear wheel with a pinion spider therebetween and jointly controlled thereby, said first named gear wheel being actuated by the hand-actuated control device; a shaft actuated by the differential means; a cam actuated by the shaft for controlling said valve device, means connecting said second gear wheel for rotation by one of said elements; a second valve device, with ducts for the operating fluid leading from the first valve device to the second valve device and controlled by said cam; ducts leading from the second named valve device to said fluid actuated motors for controlling flow of operating fluid to the same; a second differential mechanism including a bevel gear connected with one of said elements to be rotated thereby and a second bevel gear connected to the other of said elements to be rotated thereby, and a spider between said last named bevel gears and controlled thereby; a shaft connected to the spider and rotated thereby; a cam for controlling said second named valve device and operated by said last named shaft; said cams having cam faces cooperating with said shafts so that when the shafts have moved the cams to extreme positions, the shafts may move farther in the direction that operates the cam without imparting further movement to the cam; said second valve device having two slide valves therein each capable of assuming a mid position in which they will admit fluid to the ducts leading to the fluid actuated motors to maintain the same in synchronism; all of said parts cooperating so that if one of said elements advances with respect to the other element so that it is out of synchronism therewith, its movement will be arrested by the action of the second valve device and the second valve device will continue to admit operating fluid to the fluid motor means of the other element until the same is brought into synchronism.

6. In control and synchronizing means for a pair of elements in an aircraft normally movable in synchronism and each having a fluid motor drive, the combination of: manually actuated control means for the drive fluid having a valve and cam means to actuate said valve, said cam means having a manually movable first part and a valve operating second part arranged so that the initial movement of said first part will move said second part through a relatively great valve operating movement and so that the further movement of said first part will not materially move said second part; differential means actuatable by unequal movements of said elements; and control means for the drive fluid actuated by said differential means to restrict one of said fluid drives to equalize the movements of said elements, said differential control means including a valve structure having a plurality of valve closures adapted to be selectively actuated to simultaneously close off the drive fluid to and from one of said motor drives.

7. In control and synchronizing means for a pair of elements each having a power drive, the combination of: a power distributing means connected to each of said power drives whereby they may be independently supplied with power; a power control for delivering power from a power source to said distributing means; a control member; a first bevel gear connected to said control member so as to be rotated thereby; a second bevel gear facing said first bevel gear; a first bevel pinion positioned so as to roll between said first and second bevel gears; a third bevel gear connected to said second bevel gear so as to be rotated therewith; a fourth bevel gear facing said third bevel gear; a second bevel pinion positioned so as to roll between said third and fourth bevel gears; means to connect said second and third bevel gears to one of said elements so that movement of said element will be accompanied by rotation of said second and third bevel gears; means to connect said fourth bevel gear to the other of said elements so that movement thereof will be accompanied by movement of said fourth bevel gear; means connecting said first pinion to said power control whereby translational movement of said first pinion will actuate said power control; and means connecting said second pinion to said power distributing means so that translational movement of said second pinion will actuate said power distributing means in a manner to preserve substantial synchrony in the movement of said elements by said power drives.

8. In control and synchronizing means for a pair of elements each having a power drive, the combination of: a power distributing means connected to each of said power drives whereby they may be independently supplied with power; a power control for delivering power from a power source to said distributing means; a control member; first and second shafts in axial alignment; a first bevel gear turnable on said first shaft and being connected to said control member so as to be rotated thereby; a second bevel gear facing said first bevel gear; a first bevel pinion positioned so as to roll between said first and second bevel gears, there being means to rotate said first shaft in response to translational movement of said first pinion; a third bevel gear connected to said second bevel gear so as to be rotated therewith; a fourth bevel gear turnable on said second shaft and facing said third bevel gear; a second bevel pinion positioned so as to roll between said third and fourth bevel gears, there being means to rotate said second shaft in response to translational movement of said second pinion; means to connect said second and third bevel gears to one of said elements so that movement of said element will be accompanied by rotation of said second and third bevel gears; means to connect said fourth bevel gear to the other of said elements so that movement thereof will be accompanied by movement of said fourth bevel gear; means connecting said first shaft to said power control whereby translational movement of said first pinion will actuate said power control; and means connecting said second shaft to said power distributing means so that translational movement of said second pinion will actuate said power distributing means in a manner to preserve substantial synchrony in the movement of said elements by said power drives.

9. In control and synchronizing means for a pair of elements normally movable in synchronism and each having a fluid motor drive, the combination of: manually actuated control means for the drive fluid; differential means actuatable by unequal movements of said elements; a valve body having first and second ports for flows of fluid under control of said manually actuated control means; a pair of first passages connecting one end of each of said fluid drives respectively to said ports; a pair of second passages connecting the other end of each of said fluid drives respectively to said ports; first, normally open, valve means between said first port and said first passages, said valve means being operable in one direction to close one of said first passages and in another direction to close the other of said first passages; second, normally open, valve means between said second port and second passages, said second valve means being operable in one direction to close one of said second passages and in another direction to close the other of said second passages; and an operating connection between said differential means and said valves for moving said valves in such a manner that at one time said valve means will close one of said first passages and one of said second passages, and at another time will close the other of said first passages, and the other of said second passages.

GEORGE W. BUTROVICH.
CLINTON E. DEARDORFF.